Oct. 18, 1960  E. C. WARRICK ET AL  2,956,595
DRIVE MEANS FOR COMBINATION CIRCULAR SAW AND JOINTER
Filed Nov. 9, 1956  3 Sheets-Sheet 1

INVENTOR
EDWARD C. WARRICK
RAYMOND K. HOLTZ
JOSEPH KMETZ

BY Strauch, Nolan & Neale
ATTORNEYS

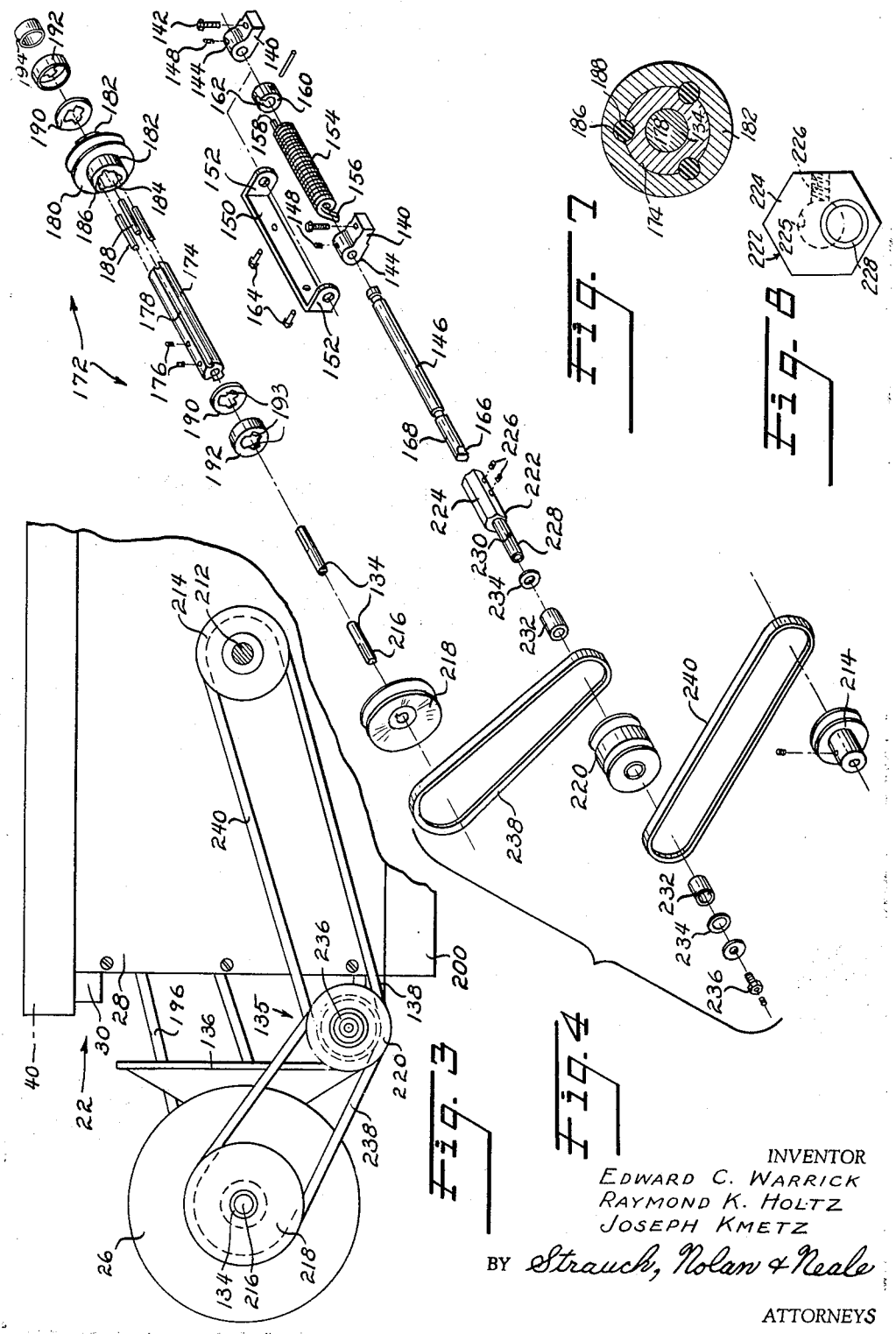

INVENTOR
EDWARD C. WARRICK
RAYMOND K. HOLTZ
JOSEPH KMETZ
BY Strauch, Nolan & Neale
ATTORNEYS

United States Patent Office 2,956,595
Patented Oct. 18, 1960

2,956,595

DRIVE MEANS FOR COMBINATION CIRCULAR SAW AND JOINTER

Edward C. Warrick and Raymond K. Holtz, Pittsburgh, and Joseph Kmetz, West Mifflin, Pa., assignors to Rockwell Manufacturing Company, Pittsburgh, Pa., a corporation of Pennsylvania Filed Nov. 9, 1956, Ser. No. 621,458

14 Claims. (Cl. 143—36)

This invention relates to a combination circular saw and jointer and more particularly is directed to a combination drive arrangement for a tilting arbor circular saw and jointer having drive connections to a common motor shaft.

Prior to this invention tilting table saw-jointer combinations have been known but it has not been considered feasible to use a common motor drive to both a tilting arbor circular saw and a second power tool such as a jointer because a complex belt and pulley drive system would be required. The primary difficulties of obtaining such a combination with a relatively simple drive system is due directly to the nature of operation of tilting arbor saws. Such saws are normally drive connected to an electric motor through a belt and pulley system, and the motor is mounted on or closely adjacent to the saw table support. Whenever the arbor is tilted, the arbor pulley is shifted in an arc about the tilt axis. Such a movement of the arbor pulley necessitates some special drive arrangement between the arbor pulley and motor pulley to maintain proper belt disposition and tension between the two pulleys. Previous solutions for this tilting arbor saw drive problem have resulted in special motor mounting structure for tilting the motor about the arbor tilting axis with the arbor; special motor mount structure with control linkage for shifting the motor laterally and vertically as the saw arbor is tilted; a special motor pulley mounted for axial shifting on an axially fixed motor shaft; and a special wide groove motor pulley on an axially fixed motor shaft to enable the belt to shift axially on the motor pulley as the saw arbor is tilted. Because of these various special motor drive arrangements it has been the practice, previous to this invention, to furnish each tilting arbor saw with an individual power unit that because of impractical and complex considerations, was not intended to be drive connected to another tool.

In shop practice it is desirable to have a circular saw and planer or jointer in close proximity and often the latter tool is used to smooth the edge of a work piece immediately after the piece has been sawed. Thus the two tools are maintained in simultaneous, dual motor operation or each must be intermittently turned on and off.

To satisfy the need for substantially conjoint operation of a circular saw and a second tool, hereinafter referred to as the jointer, which is the preferred type of second tool, this invention enables the use of a single motor to drive a tilting arbor saw and a jointer. The motor is pivotally mounted, in combination with a spring counterbalance, on the table saw body with the motor shaft and motor pivot mount disposed parallel to the vertical plane through the saw arbor axis and a drive pulley is mounted on each end of the motor shaft. One of the pulleys, used to drive the saw arbor, is an axially floating drive pulley which can shift to follow the movement of the tilting arbor pulley. Proper tension on the saw drive belt is maintained by the overhanging, spring counterbalanced arrangement of the motor relative to its pivot mount. The second drive pulley is secured to the motor shaft and drives the jointer through an intermediate transfer or idler pulley journalled on a stud shaft which is mounted on the motor pivot in a manner permitting eccentric adjustment to maintain a substantially proper tension in the jointer drive belt.

Accordingly, a primary purpose of this invention resides in providing a novel combination saw and second cutting tool such as a jointer, planer or the like.

Another object resides in providing a tilting arbor saw and adjacent second tool with a common drive motor and novel drive belt and pulley arrangement which permits the maintaining of proper saw arbor drive belt tension through the range of arbor tilt and elevation without effectively varying the tension in the drive belt arrangement for the second tool.

A further object resides in providing a saw-jointer combination with a unitary drive motor, the drive to the saw having a drive pulley mounted for axial shifting on the pulley drive shaft and the drive to the jointer having a drive pulley axially fixed to the pulley drive shaft.

Still another object resides in providing a novel drive arrangement for a tilting arbor circular saw with the motor mounted on the saw table on a pivot axis to overhang and maintain a tension on the saw drive belt and having an adjustable torsion type spring in the pivot mount to provide counterbalance of the motor for proper belt tension. To permit correct belt disposition between the saw arbor and the motor shaft, a specially devised axially floating pulley and a drive shaft adapter are fixed on the end of the motor shaft.

A still further object resides in providing a novel axially shiftable drive pulley with rod like members cooperating between a grooved drive shaft member and the pulley hub to provide a rotatable drive connection and an axially shiftable bearing arrangement between the pulley and drive member. In connection with this object is the novel use of a high polymer plastic, such as Teflon or nylon, for the drive and bearing rods between the shaft member and pulley.

Further novel features and objects of this invention will become apparent from the following detailed description and the appended claims taken in conjunction with the accompanying drawings showing preferred embodiments thereof, in which:

Figure 3 is a section view taken on line 3—3 of Figure 1 illustrating details of the motor pulley, intermediate transfer pulley and drive belts for the jointer;

Figure 4 is an exploded perspective view of the pulleys, belts and motor mount of the saw-jointer combination shown in Figure 1, with the tool and motor portions omitted;

Figure 7 is an enlarged section taken on line 7—7 of Figure 1 illustrating the matching grooves and circular plastic rods in the floating pulley assembly; and Figure 8 is a detail end view of the eccentric adapter mount for the transfer pulley between the motor and the jointer.

Figure 1:
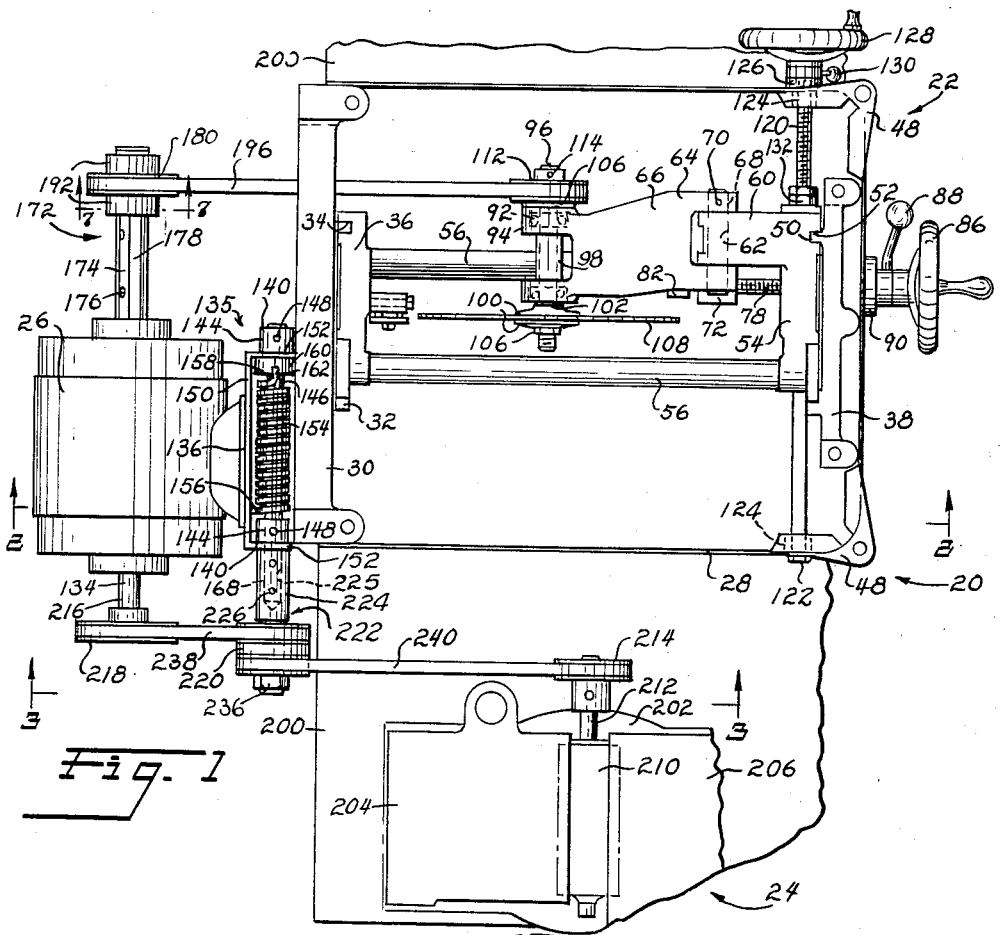
Figure 1 is a top plan view of a tilting arbor saw and jointer combination embodiment of this invention with portions of the saw and jointer broken away for clarity.

Referring now to Figure 1, the combination saw-jointer 20 is used to illustrate a preferred embodiment of this invention and includes a tilting arbor circular table saw 22 and a jointer 24 disposed side by side with the saw arbor axis and jointer arbor axis disposed to be in the same or parallel vertical planes. The two tools are powered by a single electric motor 26 mounted on the table saw frame, in a manner to be later described, with the motor axis arranged horizontal and parallel to the jointer arbor axis and with the motor fixed against lateral shifting movement.

Tilting arbor saw

With general reference to Figure 1 and noted reference to other figures, the support for table saw 22 consists of a cabinet 28, forming the front and two side walls, and a rear trunnion bracket 30, an essentially rectangular casting, fastened between the rear edges of the side walls of cabinet 28 to provide an open rear wall. An arcuate tongue 32, integrally formed on the inner side of the rear trunnion bracket 30 cooperates with a matched groove 34 in a rear trunnion 36 to permit relative arcuate movement between trunnion 36 and rear trunnion bracket 30. A front trunnion bracket 38 is fastened to the underside of the saw table 40 by cap screws 42 and the table 40 is secured to the support frame by cap screws 44 and 46 through the rear trunnion bracket 30 and flange members 48 welded to the front corners of cabinet 28. Appropriate table mounted guide rails, rip fence provisions and saw guard structure are not illustrated, as they form no specific part of this invention. The front trunnion bracket 38 has an integral arcuate tongue 50 identical to, facing and coaxially aligned with arcuate tongue 32 on the rear trunnion bracket 30, and cooperates with a matched groove 52 in a front trunnion 54.

Trunnions 36 and 54 are spaced and rigidly joined to form a tilting frame, by two tie rods 56 extending between the two trunnions. Tie rods 56 are fastened to trunnions 36 and 54 below the arcuate grooves 34 and 52 by screws 58 (see Figures 2 and 5) and thus maintain the trunnions in a fixed spaced relation to enable the aforementioned cooperative engagement with arcuate tongues 32 and 50 on the rear and front trunnion brackets. Note, trunnions 36 and 54 have an arc of approximately 130° to enable the trunnion frame to tilt at least 45 degrees relative to the saw table 40 and also the arcuate tongues 32 and 50 have their axis lying along the top surface of the table 40.

Extending rearwardly from the upper portion of front trunnion 54 is an arbor bracket journal boss 60 formed with a lateral bore 62. The spaced apertured arms 64 of a saw arbor bracket 66 are disposed over boss 60 and the bracket 66 is pivotally retained by an arbor bracket shaft 68 projected through the apertured arms 64 and bracket bore 62. Shaft 68 is axially fixed in boss 60 by a spring type pin 70. A downwardly disposed extension 72 of one of the bracket arms 64 has cross slots provided in its end 74 which embrace a threaded knuckle 76 on the threaded portion of a saw "elevating" shaft 78. Shaft 78 is rotatably journalled through a bushing 80 projecting through the front trunnion 54 and in a rear elevating stop bracket 82 fastened to one of the tie rods 56. A thrust washer 84 is fixed on elevating shaft 78 and abuts the rear face of bushing 80. The front end of elevating shaft 78 projects through an arcuate cutout (not shown) in the front wall of cabinet 28 and a handwheel 86 and conventional friction knob 88 are disposed thereon. Inasmuch as the entire aforedescribed saw elevating assembly tilts with the trunnion assembly, a pointer 90, adjustably fixed to the front end of bushing 80, cooperates with a tilt scale (not shown) fixed to the front of cabinet 28 and will represent the tilt angle of the blade.

The saw arbor bracket 66 is pivoted about the bracket shaft 68 by movement of the knuckle 76 fore and aft whenever the elevating shaft 78 is rotated. As the saw arbor assembly and blade are journalled in the bracket 66, as will be presently described, on an axis parallel to the axis of bracket shaft 68, such pivotal movement of the arbor bracket 66 will raise and lower the saw blade.

Spaced coaxial bearing retaining sockets 92 are formed integral with the arbor bracket 66 and receive the outer races of bearings 94. An arbor 96 projects through the inner races of bearings 94 and a spacer sleeve 98 is disposed between the bearings. Appropriate saw blade flanges 100, bearing spring 102 and jam nuts 106 clamp the blade 108, arbor 96 and bearings 94 in an axially fixed journalled relationship to arbor bracket 66. The pulley end of arbor 96 is grooved to receive a key 110 and a pulley 112 is placed on the end, cooperates with key 110 and is axially fixed to the arbor 96 by appropriate set screw(s) 114.

A lower extension 116 of the front trunnion 54 is provided with cross slots that embrace a "tilting" knuckle 118 threaded on a "tilt" shaft 120. Tilt shaft 120 extends horizontally between the sides of cabinet 28, one end being disposed in a socket bushing 122 maintained in one cabinet side wall by a jam nut 124 and the other end projecting through a bushing 126 maintained in the other side wall by a similar jam nut. An operating hand wheel 128 and friction collar 130 are disposed on the projecting end of tilt shaft 120. Two jam nuts (not shown) are threaded on the tilt shaft 120 to provide a stop for knuckle 118 against maximum tilt and two nuts 132 on the other side of knuckle 118 enable an adjustable zero tilt setting.

Rotation of the threaded tilt shaft 120 by handwheel 128 will move knuckle 118 laterally, which movement will cause the rigid trunnion assembly 36, 54, 66, arbor bracket 66, arbor 96, blade 108 and arbor pulley 112 to tilt. Regardless of the blade elevation, tilting occurs about an axis through the blade plane and lying along the top surface of the table 40. Elevation changes raise and lower the arbor pulley 112, swinging the arbor axis in a fore and aft arc and tilt changes swing the arbor pulley 112 and its axis in a lateral arc. Combinations of elevation and tilt can result in an infinite number of arbor pulley positions and the drive arrangement between motor 26 and the arbor pulley 112 must be able to adapt to all pulley positions and still maintain proper belt disposition and tension.

Figure 2:
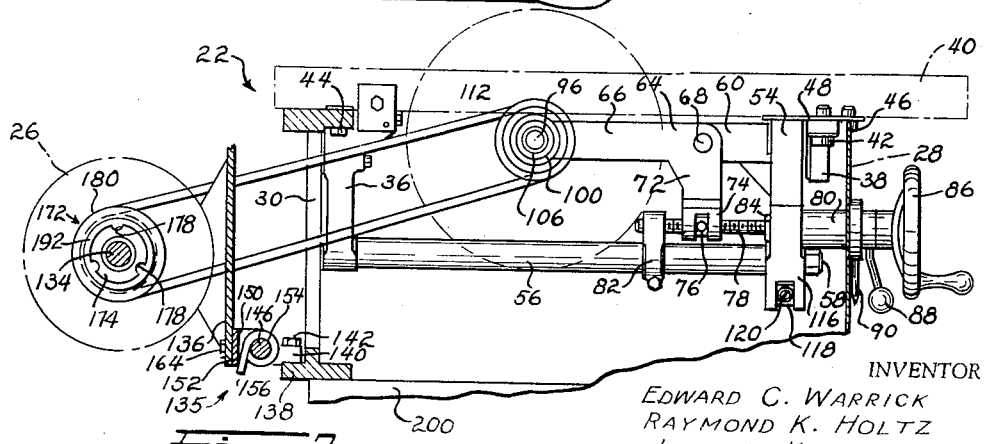
Figure 2 is an elevational side view of the saw shown in Figure 1, illustrating details of the motor pulley and drive belt for the tilting arbor saw.

The motor mount is shown assembled in the top and side views of Figures 1, 2 and 3. A suitable electric motor 26, with both ends of the motor shaft 134 projected from the motor housing, is fastened through a motor bracket assembly 135 to the lower edge of the rear trunnion bracket 30 with the motor base plate 136 facing the trunnion bracket.

Motor bracket 135 includes an adjustable torsion spring counterbalance arrangement contributing toward a rugged, compact and easily adjustable mounting unit. To afford a rigid support for the motor, an integral horizontal flange 138 is formed on the lower edge of the rear trunnion bracket 30 and two motor base mount members 140 are fastened on flange 138 by screws 142. Base mounts 140 are laterally spaced and, considered as a unit, are offset to one side of the table saw 22. Each mount 140 has a rearwardly disposed collar 144 and a motor base shaft 146 is supported in the collars 144 and non-rotatably fixed by set screws 148 located in both collars.

Motor base shaft 146 retains a motor hinge plate 150 on the two base mounts 140 by passing through apertured bent ears 152 on the ends of the hinge plate. Also carried on motor support shaft 146 is a spiral torsion spring 154 with one end 156 terminating in a substantially tangential projection to a position under the motor hinge plate 150 (see Figure 2), the other end 158 being bent to provide a short axially directed portion. A spring load collar 160, with a notch 162 on one side, is fastened, by a spring type pin, on motor support shaft 146 between hinge plate ears 152 with the axially bent spring end 158 received in notch 162. Collar 160 and torsion spring 154 occupy the axial space between the right hand hinge plate ear 154 and the left hand motor base mount 140. This arrangement positions the tangential end 156 of the torsion spring as close as possible to the center of motor 26. The lower edge of the motor base plate 136 is fastened by screws 164 to the hinge plate 150.

Motor support shaft 146, being non-rotatably secured in the base mounts 140 by the set screws 148, and the bent end 158 of torsion spring 154 being non-rotatable relative to shaft 146 by reason of its cooperation with spring load collar 160, any movement of the motor 26 and its hinge plate 150 counterclockwise (in Figure 2) due to the weight of the motor will be resisted by the torsional loading through end 156 of spring 154.

Torsion spring preload, to counterbalance the weight of motor 26 in adjusting drive belt tensions, can be adjusted by loosening set screws 148 in the base mounts 140 and rotating the support shaft 146 by means of a suitable tool engaging the shaft end flats 166 (Figure 4). When the desired torsion counterbalance is realized, the set screws 148 are tightened to again non-rotatably fix the shaft 146. The left hand end 168 of support shaft 146 (Figure 1) extends a short distance beyond the side of saw table cabinet 28 for a purpose to be later described.

The axially floating motor pulley assembly will be described with reference to Figures 1, 2 and 4. The floating pulley assembly 172, within reason, can be adapted to fit any diameter motor shaft. The assembly 172 includes a motor shaft extension 174 with an axial bore dimensioned to coaxially fit on the end of motor shaft 134. Extension 174 is essentially cylindrical, is non-rotatably secured on motor shaft by set screws 176 and provides a horizontal drive extension parallel and behind the range of lateral positions of the saw arbor pulley throughout its elevation and tilt adjustments. The cylindrical surface of extension 174 is disrupted by three axially disposed grooves 178 having a circular arc cross-section. The axes of grooves 178 are disposed a distance from the shaft extension axis which is substantially equal to the radial distance from the axis to the circumferential surface of the shaft extension.

A floating pulley 180 with an enlarged hub 182 has a bore 184 of sufficient diameter to enable a free sliding fit, with a slight annular clearance, over the shaft extension 174. Three axial grooves 186 are formed in the wall of pulley bore 184 and correspond to the axial grooves 178 of the shaft extension 174. As shown in Figure 7 each of the sets of matched grooves 178 and 186 provide a substantially completely circular track between the pulley 180 and shaft extension 174. Disposed in each of the three tracks are circular rods 188, of a high polymer plastic, such as Teflon or nylon for self lubrication. Three rods provide excellent centering characteristics but more can be used if desired. Rods 188 extend between the ends of pulley hub 182 and coact with end plates 190 (Figure 4) to be carried with the pulley as it floats axially on the extension 174. End caps 192 are press fit over the ends of the pulley hub 182 to retain the end plates 190 in position. All end plates 190 and end caps 192 have arcuate ears 193 that depend into the shaft extension grooves 178 and provide full abutment against the ends of rods 188, provide essentially complete enclosures for the rods and keep the grooves clear of foreign matter. A stop collar 194 (Figures 4, 5 and 6) is pinned by a pin 195 to the end of shaft extension 174 to prevent floating movement of pulley 180 off the end of the extension.

Figure 5:
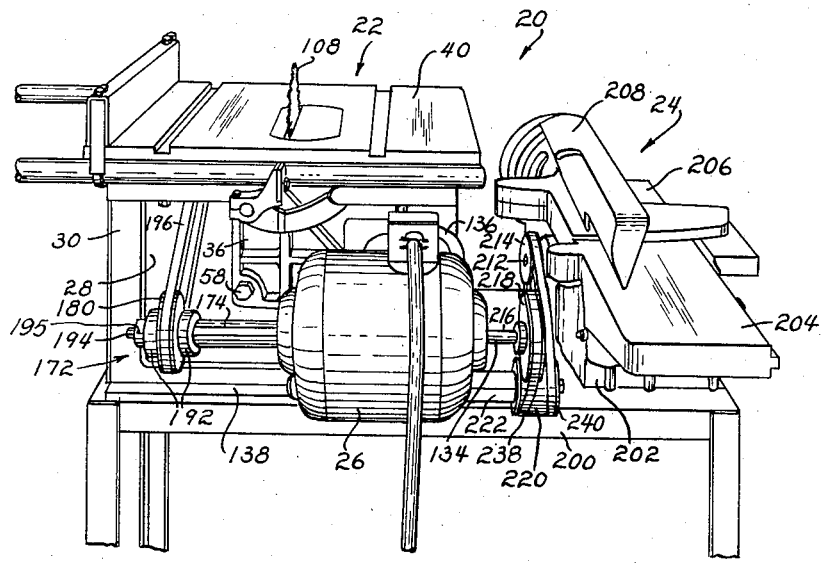
Figure 5 is a perspective view of the motor mounting end of the saw-jointer combination, illustrating the saw arbor drive pulley and belt in the position which they assume when the saw arbor is horizontal.

Rods 188 thus provide a driving connection between shaft extension 174 and pulley 180 and also enable free floating axial movement of the pulley relative to the shaft extension. In Figure 5, the saw blade 108 is disposed vertically and at a high elevation, hence its arbor pulley axis is horizontal and raised to a high position and the arbor pulley 112 is disposed, laterally and vertically, its farthest distance from motor 26. Pulley 112 is drive connected to floating pulley 180 by a V-belt 196, preferably having a steel cable core and, in the aforementioned arbor pulley position, causes the floating pulley 180 to axially position itself at the far end of the shaft extension 174. Belt tension is maintained by the weight of motor 26, suitably counterbalanced by the torsion spring 154.

Figure 6:
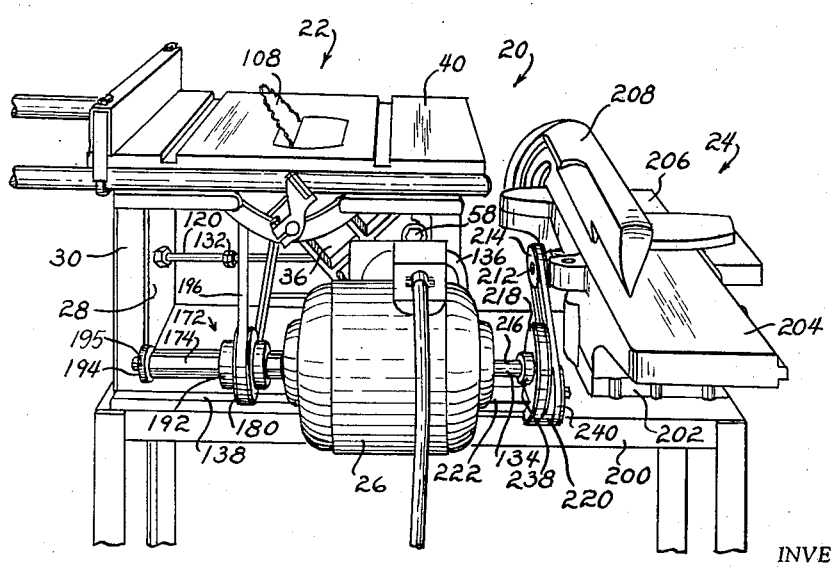
Figure 6 is a perspective view, similar to Figure 5, illustrating the saw arbor drive pulley and belt in the position which they assume when the saw arbor is tilted approximately 45 degrees.

Figure 6 is essentially the same as Figure 5 but the saw blade 108 and arbor 96 have been tilted approximately 45°, swinging the arbor pulley 112 to a lower position which is laterally closer to the motor 26. This movement twists the V-belt 196 slightly and causes floating pulley 180 to axially shift to a new position on shaft extension 174 closer to the body of motor 26. Due to the pivoted and counterbalanced motor mount, the proper V-belt tension is maintained in all positions intermediate the two illustrated positions.

*Jointer*

Again referring to Figure 1 and with specific reference to Figures 3, 5 and 6, the jointer 24 is mounted on a support such as bench 200 (Figure 5) closely adjacent the table saw 22. The jointer has a bed 202, adjustable outfeed table 204, adjustable front table 206, guide fence 208 and other elements. The rotating cutter head 210 and the cutter head arbor 212 are journalled in the jointer bed 202 on an axis parallel to that of motor shaft 134 with the jointer pulley 214 disposed on the end of arbor 212 between the jointer 24 and table saw 22.

The drive power for the jointer cutter head is derived from the projected end 216 of the motor shaft 134, opposite to the extension shaft end, which extends beyond the side of the table saw 22. A driving pulley 218 is keyed on motor shaft end 216 and is retained by a set screw.

To provide a drive connection between motor pulley 218 and the jointer arbor pulley 214, which will be essentially unaffected by the changing pivotal position of motor 26, a relatively small diameter, double sheave intermediate transfer or idler pulley 220 is journalled on an adapter 222. Adapter 222 has a sleeve portion 224 which is provided with a bore 225 to fit over the projected end 168 of the motor base shaft 146 and is non-rotatably fixed thereto by set screws 226. Integral with the adapter sleeve 224 but eccentric to the sleeve axis (Figure 8) is a pulley stud portion 228 which is hollow and has a cross passage 230 to lubricate the double sheave pulley bearings 232 (Figure 4) which can be oilite bushings. Double sheave pulley 218, oilite bushings 232 and fibre washers 234 are retained on the pulley stud 228 by a steel washer and hollow cap screw 236. Lubricant can be introduced to bushings 232 through cap screw 236, the hollow stud 228 and cross passage 230.

The motor pulley 218 and one sheave of the transfer pulley 220 are drive connected by a V-belt 238 and a further V-belt 240 drive connects the other sheave of the transfer pulley 220 and the jointer arbor pulley 214. Both V-belts can if desired be of similar construction to the V-belt 196 but they are not subject to as much stress and strain.

As previously described, the motor base shaft 146 is non-rotatably fixed by set screws to the table saw 22. This provides a fixed mount for the transfer pulley adapter 222, and after the motor base shaft 146 is adjusted and set to provide correct torsion spring counterbalance, the adapter 222 can be adjusted to eccentrically shift the transfer pulley stud 228. This latter adjustment is to enable a desired tension in the long V-belt 240 to the relatively small diameter fixed axis jointer pulley 214 and the drive V-belt 238. Once these tensions are obtained, the tension in belt 240 will be fixed and unaffected by pivoting of the motor about its support axis, resulting from changes in the tilting arbor saw axis and, although the tension in V-belt 238 will vary slightly due to swinging of the motor about its support axis, the tension change is of negligible effect in the jointer drive assembly because the change in center to center distance between the axis of the motor shaft and pulley 220 is very small compared with the average center to center distance.

If it is desired to have the slight variation in tension occur in belt 240 rather than belt 238, the motor support shaft 146 can be fixed to the motor hinge plate 150 and the shaft 146 journalled in the table mounts 140. In such a modified mounting (not shown) the tangent end 156 of torsion spring 154 can bear against the edge of lower flange 138 on the table saw trunnion bracket casting 30.

From the foregoing description it will be seen that a new combination of a tilting arbor saw and a second power tool, both driven by a common motor, is rendered possible by the combined effect of a floating pulley on the motor shaft for driving the saw arbor, the counterbalanced motor pivotal mounting and the eccentrically mounted intermediate pulley in the jointer drive. Improvements in the tilting arbor saw trunnion construction, the arbor bracket and other items provide a versatile dependable saw unit for use in the saw-jointer combination. The new floating pulley assembly incorporates self lubricating drive and bearing rods, the counterbalance torsion spring is integrally united with the motor support structure and the eccentrically mounted transfer pulley is mounted on the motor support in a unique manner.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tool combination comprising: two rotary tool cutting machines, one machine including a rotatable arbor, means for tilting said arbor about an axis normal to and offset from the arbor axis and means for swinging said arbor about an axis parallel to and offset from said arbor axis, the second machine including a fixed axis rotatable arbor; a motor having a drive shaft with projected ends; counterbalance means pivotally mounting said motor on support means rigid with said one machine with said motor shaft and pivotal mount axes parallel to the planes through which the arbor of said one machine can tilt; a first pulley on said tilting arbor; an axially floating pulley assembly drive connected to one projected end of said motor drive shaft; a belt in drive engagement between said first pulley and said floating pulley; a pulley belt adjustment member mounted on said one machine coaxial with the motor pivot mount axis including means enabling its selective rotative adjustment on said one machine about the motor pivot mount axis and a journal stud projected parallel and eccentric to the motor pivot mount axis; a multiple sheave pulley member rotatably mounted on said journal stud; a second pulley, drive connected to the other of said projected motor shaft ends; a second belt in drive engagement between said second pulley and one of the sheaves of said multiple sheave pulley member; a third pulley on said fixed axis arbor; and a third belt in drive engagement between said third pulley and a second one of the sheaves of said multiple sheave pulley.

2. A tool combination comprising: a tilting arbor table saw having a first pulley drive connected to its arbor; a motor having a drive shaft with projected ends; means pivotally mounting said motor on said table saw, said motor shaft and pivotal mount axes being parallel to the planes of tilting movement of the saw arbor and the pivotal mount axis, and the center of mass of said motor being disposed relative to the tilting arbor so said motor will tend to swing away from the tilting arbor; an axially floating pulley assembly, drive connected to one projected end of said motor drive shaft; a belt in drive engagement between said first pulley and said floating pulley; a second power tool machine fixed adjacent said tilting arbor table saw with a drive input pulley having an axis parallel to the axis of said motor shaft; a pulley belt adjustment member mounted on said table saw coaxial with the pivotal mount axis including means enabling selective rotative adjustment of said member relative to said table saw and coaxially relative to the pivotal mount axis and a journal stud projected parallel and eccentric to the motor pivot mount axis; a multiple sheave pulley member rotatably mounted on said journal stud; a drive output pulley connected to the other of said projected motor shaft ends; a second belt in drive engagement between said drive output pulley and one of the sheaves of said multiple sheave pulley member; and a third belt in drive engagement between said drive input pulley and a second one of the sheaves of said multiple sheave pulley.

3. The tool combination as defined in claim 2, wherein said floating pulley assembly includes a shaft extension clamped on said one projected end of said motor shaft with external axial grooves, a pulley axially slidable on said extension with internal axial grooves matched with said extension grooves, and high polymer plastic rods in said matched grooves providing an axially shiftable, rotatable drive connection between said internally grooved pulley and said extension.

4. The tool combination as defined in claim 2, wherein said means pivotally mounting said motor on said table saw includes: spaced coaxial collars, fixed on said table saw; a motor pivot shaft non-rotatably fixed in said collars; a hinge member fixed rigid on said motor with two spaced ears pivotally engaged on said pivot shaft adjacent said spaced collars; a spiral torsion spring coaxially disposed over said pivot shaft with one end non-rotatably fixed to said pivot shaft and the other end abutting said hinge member whereby pivotal movement of said motor on said pivot shaft away from said table saw will be counterbalanced by said torsion spring.

5. A combination saw-jointer comprising: a circular saw arbor with a first pulley drive connected thereto; means rotatably supporting said saw arbor and mounted for selective arbor tilt and arbor elevation change; a jointer cutter head arbor with a second pulley drive connected thereto; means rotatably mounting said cutter head arbor on a fixed axis disposed parallel to planes of saw arbor tilt movement; a motor with a drive shaft having two driving ends; an axially floating pulley means, drive connected to one of said drive shaft driving ends; a third pulley drive connected to the other of said drive shaft driving ends; means pivotally supporting said motor and providing a force which tends to bias it away from said saw arbor and the motor drive shaft is parallel, and will swing about the motor pivotal support axis in a manner to remain parallel, to the jointer cutter arbor; an adapter unit having a base adjustably secured to said motor support to permit selective rotative movement about the axis of the motor pivotal support means and a journal stud parallel and eccentric to the motor pivotal support means; a multiple sheave journalled on said stud; a first belt in drive engagement between said first pulley and said floating pulley means; a second belt in drive engagement between said third pulley and one of the sheaves of said multiple sheave pulley; and a third belt in drive engagement between said third pulley and one of the sheaves of said multiple sheave pulley.

6. The combination saw-jointer defined in claim 5, wherein said axially floating pulley means includes an axially grooved extension, a pulley with an axially grooved bore slidably disposed on said axially grooved extension, and high polymer plastic rods in said grooves keying said axially grooved pulley to said axially grooved extension and permitting substantially friction free axial shift between said axially grooved pulley and said extension.

7. For use in combination with a tilting arbor circular table saw, having a pulley drive connected to the tilting arbor, and a jointer mounted in fixed adjacent relationship to the table saw, with the axis of its cutting head arbor pulley parallel to the planes of tilt of the saw arbor axis, drive means comprising: a motor having a shaft with projected ends; an axially floating pulley, drive connected to one of said projected shaft ends; an axially fixed pulley drive connected to the other of said projected shaft ends; a pivotal motor support including a torsion spring counterbalance device for swingably mounting said motor on the table saw; an adapter secured to said motor support, adapted to be selectively rotated about the motor support pivot axis and including an eccentric journal stud parallel to said motor shaft; and a multiple sheave pulley rotatable on said journal stud; whereby said floating pulley and said saw arbor pulley can be connected by a drive belt and two drive belts can drive connect said axially fixed motor pulley, said multiple sheave pulley and said jointer arbor pulley.

8. The tool combination as defined in claim 2, wherein said means pivotally mounting said motor on said table saw includes: spaced coaxial collar members fixed on said table saw; a motor support shaft disposed in said collar members; a hinge member fixed rigid on said motor with spaced apertured members disposed on said motor support shaft adjacent said spaced collars; a spiral torsion spring coaxially disposed over said motor support shaft with one end fixed relative to said table saw and the other end fixed relative to said motor hinge member; and means between one of the ends of said spring and the element to which said one end is fixed enabling torsional adjustment of said spring.

9. A combination tool comprising: a tilting arbor tool assembly having a support frame; a work support table fixedly mounted on said support frame and having a tool aperture therein and a tool arbor operatively tiltably mounted on said support frame below said table tool aperture; a first driven pulley mounted on said tool arbor; a drive motor, having a motor shaft, the ends of which protrude from opposite ends of said motor, hingedly mounted on said support frame on an axis generally paralleling said tool arbor and the motor shaft; a second power tool assembly fixedly supported with respect to said tilting arbor tool assembly and having a second support frame; a work support table mounted on said second support frame and having a second tool aperture therein and a second tool arbor mounted on said second support frame below said second work support table tool aperture; a second driven pulley mounted on said second tool arbor; and drive means interconnecting said first and said second driven pulleys to the respective opposite ends of said motor shaft comprising a floating pulley on one end of said motor shaft and drive belt means interconnecting said floating pulley and said first driven pulley for driving said tiltably mounted tool arbor in all of its tilted operative positions, and a drive pulley on the other end of said motor shaft, and drive belt means, interconnecting said drive pulley and said second driven pulley for driving said second tool arbor, comprising a double sheave idler pulley, adjustable means mounting said idler pulley for rotation around an axis eccentrically orbitally adjustable around said motor hinge axis, a first drive belt interconnecting said drive pulley and said idler pulley, and a second drive belt interconnecting said idler pulley and said second driven pulley, whereby the relative tensions of said first and second drive belts may be initially adjusted to avoid varying tensions in said second drive belt as the motor swings around its hinge axis.

10. For use in combination with a tilting arbor circular table saw, having a pulley drive connected to the tilting arbor, and a jointer mounted in fixed adjacent relationship to the table saw, with the axis of its cutting head arbor pulley parallel to the planes of tilt of the saw arbor axis, drive means comprising: a motor having a shaft with projected ends; an axially floating pulley, drive connected to one of said projected shaft ends; an axially fixed pulley drive connected to the other of said projected shaft ends; a pivotal motor support including a pivot shaft parallel to said motor shaft and a torsion spring counterbalance device on said pivot shaft for swingably mounting said motor on the table saw; an idler pulley adapter secured to said motor support comprising, a base member with a bore formed therein to closely fit over said pivot shaft, means to fix said base member to the motor support pivot shaft for selective rotational adjustment of the adapter about the motor support pivot axis and a journal stud integral with said base member with its axis parallel and eccentric to the axis of the bore in said base member; and a multiple sheave pulley rotatable on said journal stud; whereby said floating pulley and said saw arbor pulley can be connected by a drive belt and two drive belts can drive connect said axially fixed motor pulley, said multiple sheave pulley and said jointer arbor pulley.

11. An axially floating pulley assembly comprising: a shaft member with axially disposed grooves in its exterior surface; a pulley including a hub portion with an axial hole therein dimensioned to provide a close free sliding fit with said shaft member, the hole having its surface formed with axially disposed grooves corresponding with said shaft member grooves to provide sets of matched pulley and shaft member grooves; a rod, approximately equal in length to the axial dimension of said pulley hub, slidably disposed in each set of matched grooves, said rod being made of a high polymer plastic material having a low coefficient of friction; and means on said pulley to engage and axially retain said rods, relative to a said pulley, within the pulley grooves during axial sliding movement of the pulley in both directions on said shaft member.

12. For use on a driving shaft for power tools, an axially floating drive pulley means comprising: a shaft extension with an axial bore adapted to fit on a driving shaft, said extension having external longitudinal grooves; a pulley with a hub having a bore of slightly larger diameter than the diameter of the shaft extension to provide a slight clearance therebetween for free sliding movement of the pulley on the shaft extension, said pulley hub bore having longitudinal grooves registering with the grooves in said shaft extension; elongate keys closely but slidably fitting within said registered grooves, said keys being made of a high polymer plastic material having a low coefficient of friction; and means fastened on both ends of the pulley hub for engaging and retaining said keys to prevent longitudinal movement of the keys in the pulley and closely slidably fitting into the longitudinal grooves in said shaft extension.

13. An axially shiftable drive connection comprising: an elongate shaft member having external longitudinal grooves; a sleeve member with an axial hole of similar cross section slightly larger than that of said shaft member to provide a slight clearance therebetween for free relative sliding movement between said members; said sleeve member hole having longitudinal grooves registering with the grooves in said shaft member; elongate keys closely but slidably fitting within said registered grooves, said keys being made of a high polymer plastic material having a low coefficient of friction; and means on the ends of said sleeve member for engaging and retaining said keys to prevent longitudinal movement of the keys in the sleeve member to thereby provide an axially evenly balanced drive load on said sleeve from said shaft throughout the range of shaft of said sleeve.

14. The drive connection as defined in claim 13, wherein the longitudinal grooves in said shaft member and the grooves in said sleeve member have semicircular cross sections and said keys are circular rods.

References Cited in the file of this patent

UNITED STATES PATENTS

| | | |
|---|---|---|
| 369,364 | Putnam | Sept. 6, 1887 |
| 888,765 | Stevens | May 26, 1908 |
| 980,044 | Apple | Dec. 27, 1910 |
| 1,081,286 | German | Dec. 9, 1913 |
| 1,252,550 | Champney | Jan. 8, 1918 |
| 1,922,151 | Boice et al. | Aug. 15, 1933 |
| 1,942,834 | Railley | Jan. 9, 1934 |
| 2,168,282 | Tautz | Aug. 1, 1939 |
| 2,299,262 | Uremovich | Oct. 20, 1942 |
| 2,332,270 | Shaw | Oct. 19, 1943 |
| 2,530,290 | Collins | Nov. 14, 1950 |
| 2,690,084 | Van Dam | Sept. 28, 1954 |
| 2,758,615 | Mastriforte | Aug. 14, 1956 |
| 2,792,858 | Bryant | May 21, 1957 |

FOREIGN PATENTS

| | | |
|---|---|---|
| 158,111 | Australia | Aug. 6, 1954 |